United States Patent
Wurm et al.

(10) Patent No.: US 6,437,293 B2
(45) Date of Patent: Aug. 20, 2002

(54) BAKING OVEN WITH TEMPERATURE SENSOR

(75) Inventors: Josef Wurm, Feichten; Peter Mallinger, Traunreut, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/773,219

(22) Filed: Jan. 31, 2001

Related U.S. Application Data

(63) Continuation of application No. PCT/EP99/05418, filed on Jul. 28, 1999.

(30) Foreign Application Priority Data

Jul. 31, 1998 (DE) .......................................... 198 34 644

(51) Int. Cl.$^7$ .............................. A21B 1/40; A21B 1/22
(52) U.S. Cl. ...................................... 219/413; 219/469
(58) Field of Search ................................ 219/413, 409, 219/400, 385–386, 391, 448.12, 448.11, 441; 99/331

(56) References Cited

U.S. PATENT DOCUMENTS

| | | | | |
|---|---|---|---|---|
| 3,511,971 A | * | 5/1970 | Keating | 219/448.11 |
| 3,668,371 A | * | 6/1972 | Fry et al. | 219/413 |
| 4,357,522 A | * | 11/1982 | Husslein et al. | 219/400 |
| 4,641,015 A | * | 2/1987 | Mayeur | 219/386 |
| 5,397,873 A | * | 3/1995 | Stoops et al. | 219/448.12 |

FOREIGN PATENT DOCUMENTS

| | | | |
|---|---|---|---|
| DE | 3442848 A | * | 6/1986 |
| DE | 39 04 135 C2 | | 8/1990 |
| DE | 195 05 588 A1 | | 8/1996 |
| DE | 296 11 237 U1 | | 10/1996 |
| EP | 0 306 885 A1 | | 3/1989 |
| JP | 2000205574 A | * | 7/2000 |

* cited by examiner

*Primary Examiner*—Teresa Walberg
*Assistant Examiner*—Quang Van
(74) *Attorney, Agent, or Firm*—Laurence A. Greenberg; Werner H. Stemer; Ralph E. Locher

(57) ABSTRACT

A baking oven defines a cooking space, in which a tubular, multiply bent radiant heating element is secured in a horizontally extending heating element plane. A temperature sensor for regulating the temperature of the cooking space is disposed substantially in the heating element plane and has a sensor tube that is disposed in close proximity to the radiant heating element for thermal coupling to the heating element. A temperature sensor with flexible leads is secured in the sensor tube for obtaining good coupling of the temperature sensor to the radiant heating element. The sensor tube has at least one curved portion, whereby the sensor tube curves around portions of the heating element. The heating element plane defines a measuring area lying in the heating element plane, and the temperature sensor is disposed approximately at a center of gravity of the measuring area and is substantially surrounded by the heating element.

4 Claims, 1 Drawing Sheet

BAKING OVEN WITH TEMPERATURE SENSOR

CROSS-REFERENCE TO RELATED APPLICATION

This application is a continuation of copending International Application No. PCT/EP99/05418, filed Jul. 28, 1999, which designated the United States.

BACKGROUND OF THE INVENTION

FIELD OF THE INVENTION

The invention lies in the field of appliances. The invention relates to a baking oven with a cooking space, in which a tubular, multiply bent radiant heating element is secured in a substantially horizontally extending heating element plane, and with a temperature sensor for regulating the temperature of the cooking space. The sensor tube of temperature sensor is disposed in close proximity to the radiant heating element for thermal coupling to the heating element. The invention relates to a correspondingly configured temperature sensor.

A baking oven is disclosed in German Published, Non-Prosecuted Patent Application DE 195 44 908 A1. In the document, an outer grill heating element and an inner grill heating element is secured on a heating element flange by various stabilizing bars in the region of the ceiling of the cooking space of the baking oven. Moreover, a straight thermally protective sensor tube is secured in the heating element flange between two straight initial portions of the inner grill-heating element. To achieve a responsive regulation of the temperature in the cooking space reproducibly for a large number of baking ovens, the thermal coupling of the temperature sensor to the heating element, that is, in particular, their relative position with respect to one another, must be noted exactly.

In German Patent DE 34 42 848 C2, it is proposed that the coupling length between the temperature sensor and the radiant heating element of a baking oven should be fixed by appropriate choice of the position of the transitional point between the resistance coil and the straight connecting portion of the radiant heating element in the region along the straight temperature sensor.

SUMMARY OF THE INVENTION

It is accordingly an object of the invention to provide a baking oven with a cooking space that overcomes the hereinafore-mentioned disadvantages of the heretofore-known devices of this general type and that improves the thermal coupling of the temperature sensor to the radiant heating element.

With the foregoing and other objects in view, there is provided, in accordance with the invention, a baking oven, including walls defining a cooking space, a tubular, multiply-bent radiant heating element secured in the cooking space in a substantially horizontally-extending heating element plane, the heating element having a portion, and a temperature sensor disposed substantially in the heating element plane for regulating temperature of the cooking space, the temperature sensor having a sensor tube disposed in close proximity to the heating element for thermal coupling to the heating element, the sensor tube having at least one curved portion curved around the portion of the heating element, and flexible leads secured in the sensor tube.

The invention achieves these characteristics by securing a temperature sensor with flexible leads in the sensor tube, disposing the temperature sensor substantially in the heating element plane, and by the sensor tube having at least one curved portion, whereby the sensor tube curves around the heating element portion. The configuration makes it possible to place the temperature sensor at locations in the heating element plane that previously could not be achieved for straight sensor tubes. It is possible to dispense with the parallel placement of the straight temperature sensor with respect to a straight heating element portion, which is particularly critical with respect to production tolerances. The possibilities for disposing the temperature sensor according to the invention in a robust way, in terms of automatic control technology, means that it may no longer be necessary to carry out the laborious final checks on the regulating properties of the baking oven. It is particularly favorable if the conventional capillary-tube sensors are replaced by measuring resistors with flexible electric leads that are secured in the sensor tube.

A configuration that is particularly compact and simple in terms of assembly is obtained if the sensor tube and the radiant heating element are secured together on a heating element flange. In spite of being secured together, it is possible, due to the curving of the sensor tube, for the temperature sensor to be placed at any desired point in the heating element plane, and at any suitable location within the radiant heating element.

In order not to be required to place the sensor tube too close to the region of the ceiling of the baking oven, the sensor tube and the radiant heating element are secured in an advantageous way at the same height on a rear wall in the cooking space. Such securing reliably rules out excessive thermal coupling of the temperature sensor to the ceiling of the cooking space.

According to a preferred embodiment, the temperature sensor is disposed approximately at the center of gravity of a measuring area that lies in the heating element plane and is substantially surrounded by heating element portions. Such a configuration of the temperature sensor has proven to be particularly robust. Thus, small positional deviations of the temperature sensor in the measuring area have scarcely any influence on the control response of the baking oven. Moreover, suitable choice of the measuring area makes the coupling of the temperature sensor to the radiant heating element, in terms of automatic control technology, excellent for all operating modes.

In order not to adversely affect the control response of the baking oven, the curved portion of the sensor tube is disposed at a distance from the radiant heating element such that an air gap is formed and no direct heat conduction can take place from the radiant heating element to the sensor tube.

With the objects of the invention in view, there is also provided a temperature sensor, including a curved sensor tube, and flexible leads secured in the sensor tube.

Other features that are considered as characteristic for the invention are set forth in the appended claims.

Although the invention is illustrated and described herein as embodied in a baking oven with temperature sensor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
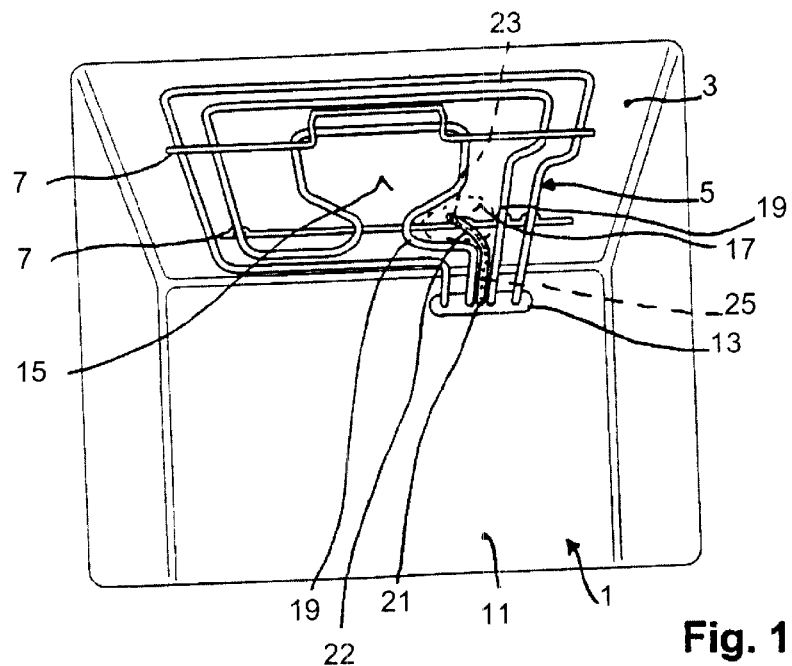
FIG. 1 is a fragmentary, frontal, perspective view of a cooking space of a baking oven according to the invention.

In all the figures of the drawing, sub-features and integral parts that correspond to one another bear the same reference symbol in each case.

Referring now to the figures of the drawings in detail and first, particularly to FIG. 1 thereof, there is shown a baking oven, not represented in any more detail, having a cuboidal cooking space 1 that can be closed at the front by a non-illustrated, hinged baking oven door. Directly beneath a top wall 3 of the cooking space 1 there is secured in the cooking space 1 a conventional, two-part, upper-heat or grill heating element 5 that extends over virtually the entire area of the top wall 3. The radiant heating element 5 is disposed parallel to the top wall 3 at a small distance directly beneath the top wall 3. Serving to secure the radiant heating element 5, there are, on one hand, two fastening bars 7 that are secured on the top wall 3 and, at the same time, lend the radiant heating element 5 the required mechanical stability. On the other hand, the radiant heating element 5 is fastened in a rear wall 11 of the cooking space 1 by a plate-shaped, heating element flange 13. In the configuration, tubular end portions of the radiant heating element 5 extend out of the cooking space 1 through corresponding openings in the heating element flange 13. The tubular end portions of the radiant heating element 5 are connected there to a system voltage in a conventional manner through a non-illustrated switching and controlling unit of the baking oven corresponding to the control technology needs. The multiply bent, two-part tubular heating element 5 extends in a heating element plane 15 that runs just below the top wall 3, parallel to the top wall 3. A bounded measuring area 17 in the heating element plane 15 is denoted in FIG. 1 by a broken line. The measuring area 17 is substantially surrounded on all sides by various heating element portions 19. A thermally conducting sensor tube 21 is also secured in the heating element flange 13 at the same height as the two-part, upper-heat heating element 5. The sensor tube has a curved portion 22, whereby the sensor tube 21 initially extends substantially parallel to the tubular heating element 5 in the heating element plane 15 to curve about an approximately right-angled bend of the tubular heating element 5 into the measuring area 17 as it becomes increasingly distant from the heating element flange 13. A platinum 500 temperature-measuring resistor 23 is disposed in the region of the free end portion of the sensor tube 21 in the interior of the sensor tube 21, approximately at the center of gravity of the measuring area 17. The resistor is made much shorter than the sensor tube 21 itself. At the measuring point, there is an excellent coupling of the measuring resistor 23 to the radiant heating element 5 and to other heat sources in the cooking space 1, such as, for example, additional heating elements present or items to be cooked disposed in the cooking space 1. In addition, small deviations in the position of the measuring resistor 23 within the measuring area 17 have scarcely any disadvantageous effects on the control response of the baking oven. For fixing the position of the sensor tube 21, in particular during cooking operation, the sensor tube is secured on one of the fastening bars 7. Connected to the measuring resistor 23 are flexible electric leads 25 (illustrated as a dashed line) that are led through the sensor tube 21 out of the cooking space 1 of the baking oven in the region of the heating element flange 13. During assembly, the temperature sensor 23 is pushed with the leads 25 into the sensor tube 21 until the temperature sensor 23 butts against the closed free end of the sensor tube 21. Required strain relief is subsequently ensured by a temperature-resistant adhesive in the sensor tube 21. The leads 25 are connected to the non-illustrated control unit of the baking oven for regulating the baking oven temperature.

Figure 2:
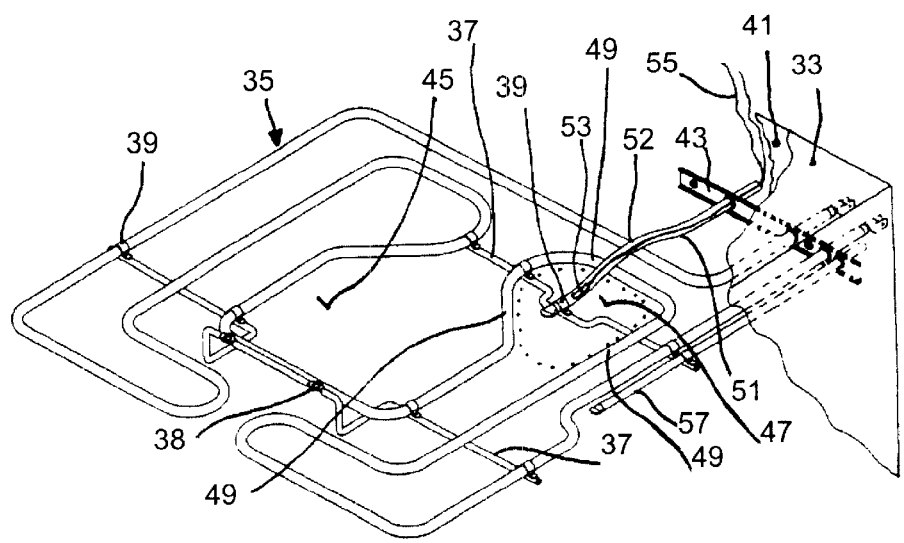
FIG. 2 is a fragmentary, perspective view of a second exemplary embodiment of the radiant heating element and temperature sensor of FIG. 1.

In a way analogous to the first exemplary embodiment, a second exemplary embodiment is shown in FIG. 2. Therein, a one-part, multiply bent, tubular, upper-heat heating element 35 is secured beneath a top wall 33 of a cooking space (not shown in any more detail) of a baking oven. Fastening bars 37 secure and stabilize the heating element 35. The bars 37 have, on one hand, fastening openings 38 for securing the upper-heat heating element 35 on the top wall 33 of the cooking space and, on the other hand, holding clips 39 for securing and stabilizing the tubular heating element 35. The tubular heating element 35 is secured in a rear wall 41 of the cooking space by a plate-shaped, heating element flange 43. The end portions of the upper-heat heating element 35 protrude with electrical connectors out of the cooking space through corresponding openings in the heating element flange 43. The upper-heat heating element 35 defines a heating element plane 45 that extends substantially parallel to the top wall 33 of the cooking space of the baking oven. A dotted line in the heating element plane 45 illustrates the measuring area 47, which is bounded substantially on all sides by heating element portions 49 of the upper-heat heating element 35. A sensor tube 51 is secured at the same height as the upper-heat heating element 35 in the heating element flange 43 and is led out of the cooking space through a corresponding flange opening through the rear wall 41. Because the upper-heat heating element 35 extends between the heating element flange 43 and the measuring area 47, the sensor tube 51 has a curved portion 52, which makes it possible for a platinum 500 temperature-measuring resistor 53 disposed in the end region of the sensor tube 51 to be disposed substantially in the measuring area 47. The temperature sensor 53 is disposed approximately at the center of gravity of the measuring area 47 in the heating element plane 45. The measuring location has proved to be particularly favorable with respect to the control response of the baking oven. The coupling of the measuring sensor 53 in the measuring area 47 to the upper-heat heating element 35 is, on one hand, good enough to be able to provide a rapid control response and, on the other hand, relatively insensitive to small positional deviations of the temperature sensor 53 within the measuring area 47. To ensure the location of the platinum 500 measuring sensor 53 in the measuring area 47 in a defined way during operation of the baking oven, the end portion of the sensor 51 is fastened with a holding clip 39 to the fastening bar 37 and, consequently, to the upper-heat heating element 35. Moreover, the curved portion 52 is configured such way that the sensor tube 51 does not touch the upper-heat heating element 35 over its entire length. Electrical leads 55 of the temperature sensor 53 are led through the sensor tube 51 out of the cooking space and are connected to a corresponding non-illustrated control unit of the baking oven for regulating the temperature of the cooking space. In particular, for a self-cleaning operating mode, a second temperature sensor 53 is stably secured in the heating element flange 53 on the upper-heat heating element 35 parallel to a straight portion of the upper-heat heating element 35.

We claim:

1. A baking oven, comprising:

walls defining a cooking space;

a tubular, multiply-bent radiant heating element secured in said cooking space in a substantially horizontally-extending heating element plane, said heating element having portions; said heating element plane defining a measuring area lying in said heating element plane, said measuring area having a center of gravity; and a temperature sensor disposed substantially in said heating element plane for regulating temperature of said cooking space, said temperature sensor disposed approximately at said center of gravity and substantially surrounded by said portions, said temperature sensor having:

a sensor tube disposed in close proximity to said heating element for thermal coupling to said heating element, said sensor tube having at least one curved portion curved around a portion of said heating element; and flexible leads secured in said sensor tube.

2. The oven according to claim 1, including a heating element flange, said sensor tube and said heating element being secured together on said heating element flange.

3. The oven according to claim 1, wherein said walls include a rear wall, and said sensor tube and said heating element are secured at the same height on said rear wall.

4. The oven according to claim 1, wherein said portions of said heating element include at least one curved portion, and said sensor tube is disposed in said at least one curved portion at a distance from said at least one curved portion to form an air gap.

* * * * *